(12) United States Patent
Kato

(10) Patent No.: US 6,641,119 B2
(45) Date of Patent: Nov. 4, 2003

(54) VIBRATION-DAMPING DEVICE HAVING INDEPENDENT MASS MEMBER

(75) Inventor: Rentaro Kato, Kasugai (JP)

(73) Assignees: Tokai Rubber Industries, Ltd., Komaki (JP); Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/027,425

(22) Filed: Dec. 22, 2001

(65) Prior Publication Data

US 2002/0101013 A1 Aug. 1, 2002

(30) Foreign Application Priority Data

Jan. 29, 2001 (JP) ........................................ 2001-020207

(51) Int. Cl.[7] .............................................. F16F 13/00
(52) U.S. Cl. .............................. 267/140.12; 267/140.4; 267/141
(58) Field of Search ........................ 267/140.11, 140.12, 267/140.3, 141, 141.1, 141.2–141.5, 219, 293

(56) References Cited

U.S. PATENT DOCUMENTS

| | | | |
|---|---|---|---|
| 2,714,161 A | | 7/1955 | Featherstun |
| 3,612,222 A | | 10/1971 | Minor |
| 5,037,073 A | * | 8/1991 | Matsumoto et al. ... 267/140.12 |
| 5,413,319 A | * | 5/1995 | Hein et al. ............. 267/140.12 |
| 5,731,359 A | * | 3/1998 | Moser et al. .......... 267/140.11 |

FOREIGN PATENT DOCUMENTS

| | | |
|---|---|---|
| JP | B2-125878 | 8/1938 |
| JP | 57-52305 | 3/1982 |
| JP | 64-42591 | 3/1989 |
| JP | 2-256933 | 10/1990 |
| JP | 3-86227 | 8/1991 |
| JP | 4-46246 | 4/1992 |
| JP | 7-45892 | 5/1995 |
| JP | 8-247216 | 9/1996 |
| JP | 9-329182 | 12/1997 |
| JP | 10-267069 | 10/1998 |
| JP | 2000-356243 | 12/2000 |
| WO | WO 00/14429 | 3/2000 |

* cited by examiner

*Primary Examiner*—Christopher P. Schwartz
*Assistant Examiner*—Melanie Torres
(74) *Attorney, Agent, or Firm*—Beyer Weaver & Thomas, LLP

(57) ABSTRACT

Disclosed is a vibration-damping device comprising: a first and a second mounting member disposed in mutually spaced apart relationship with each other and attachable to two members of a vibration system, respectively; and an elastic body disposed between and elastically connecting the first and second mounting members and including a connecting portion adapted to primarily connect the first and second mounting members. The connecting portion has a hollow housing portion in which an independent mass member is accommodated such that the independent mass member is independently displaceable relative to the housing portion without being bonded to the housing portion, and is brought into direct and elastic impact against the housing portion.

16 Claims, 5 Drawing Sheets

VIBRATION-DAMPING DEVICE HAVING INDEPENDENT MASS MEMBER

INCORPORATED BY REFERENCE

The disclosure of Japanese Patent Application No. 2001-020207 filed on Jan. 29, 2001 including the specification, drawings and abstract is incorporated herein by reference in its entirety.

BACKGROUND OF THE INVENTION

1. Field of the Invention

The present invention relates generally to a vibration-damping device which exhibits a vibration damping or isolating effect on the basis of an elastic deformation of a rubber elastic body, and more particularly to such a vibration-damping device which is novel in construction and which is suitably applicable to an engine mount, a body mount, and a suspension bushing for an automotive vehicle, for example.

2. Description of the Related Art

As one kind of vibration dampers such as an engine mount or a suspension bushing for an automotive vehicle, for flexibly connecting two members in a vibration system or mounting one of the two members on the other member in a vibration damping fashion, there is known a vibration-damping device having an elastic body made of rubber, which elastically connects a first and a second mounting member that are disposed in a mutually spaced-apart relationship with each other and attachable to these two members of the vibration system. Keeping pace with a recent demand on upgrading damping capability of the vibration dampers, a fluid-filled vibration-damping device has been developed. The fluid-filled vibration-damping device includes a fluid chamber partially defined by the elastic body and filled with a non-compressible fluid, and exhibits an improved vibration-damping device on the basis of resonance or flows of the non-compressible fluid in the fluid chamber induced when the vibration-damping device is subjected to a vibrational load.

Upon application of the vibrational load to such a vibration-damping device, the elastic body is elastically deformed periodically. Since the elastic body itself constitutes a vibration system, the elastic body is likely to suffer from a surging thereof upon application of the vibrational load whose frequency band corresponds to a natural frequency of the elastic body. The surging of the elastic body may deteriorate vibration damping characteristics of the vibration-damping device, whereby the vibration-damping device is incapable of exhibiting a desired damping effect.

A surging frequency: fn of the elastic body may be obtained according to the following equation on the basis of a basic model of the vibration-damping device including the first and second mounting members and the elastic body elastically connecting the first and second mounting members:

$$fn = (N/2L)\sqrt{(G/\rho)}$$

where,
- L: distance of effective free length of the elastic body;
- G: dynamic modulus of elasticity;
- $\rho$: density of the elastic body; and
- N: degree of a mode of vibration.

In general, the surging of the elastic body in a first mode or harmonic of vibration (N=1) is required to be damped, since an amplitude of the surging of the elastic body is maximized in the first mode.

To cope with the problem of surging of the elastic body, various kinds of surging limiting members incorporated in the vibration-damping device has been proposed. For instance, JP-A-2-256933 discloses a surging limiting member of dynamic damper type in which a pair of support arm protrude from the elastic body so as to support mass members at their protruding end portions, respectively. These support arms and the mass members cooperate to constitute a dynamic damper serving as a subsidiary vibration system, so that the vibration-damping device equipped with this surging limiting member enables to limit or restrict the surging of the elastic body owing to resonance of the subsidiary vibration system. Further, JP-A-10-267069 discloses a surging limiting member of mass damper type in which a ring member serving as a mass damper is fixedly disposed in the elastic body so as to adjust the mass of a surging portion of the elastic body.

However, the disclosed surging members of the dynamic damper type and the mass damper type exhibit their surging limiting effects with respect only to very limited frequency bands, to which these surging members are tuned. This makes it difficult to desirably tune a natural frequency of the subsidiary vibration system, i.e., the dynamic damper of the vibration-damping device, and a natural frequency of a primary vibration system of the vibration-damping device equipped with the mass damper in the form of the ring member.

Moreover, the surging frequency of the elastic body of the vibration-damping device varies depending upon a spring stiffness of the elastic body which is changed due to a change of the ambient temperature. Therefore, even if the disclosed vibration-damping device having the surging limiting members are desirably tuned in their initial or static states, the surging limiting member may possibly become incapable of exhibiting intended surging limiting effects, due to the above-indicted change of the surging frequency of the elastic body. Thus, the conventional vibration-damping devices equipped with the surging limiting members still suffer from difficulty in exhibiting desired surging limiting effects with high stability.

SUMMARY OF THE INVENTION

It is therefore one object of this invention to provide a vibration-damping device, which is novel and simple in construction, which is able to eliminate or minimize a problem of deterioration of vibration damping capability thereof due to a surging of an elastic body thereof, and which is capable of exhibiting an excellent vibration damping effect over a wide frequency band.

The above and/or optional objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whose specification and drawings or that may be recognized by those skilled in the art in the light of the disclosure in the whole specification and drawings.

(1) A vibration-damping device for elastically connecting two members of a vibration system in a vibration damping fashion, the vibration-damping device comprising: (a) a first mounting member attachable to one of the two members of the vibration system; (b) a second mounting member disposed away from the first mounting member and attachable to an other one of the two members of the vibration system; (c) an elastic body disposed between and elastically connecting the first and second mounting members, the elastic body including a connecting portion that extends between the first and second mounting members and has a hollow housing portion; and (d) an independent mass member accommodated in the housing portion such that the independent mass member is independently displaceable relative to the housing portion without being bonded to the housing portion, and such that the independent mass member is brought into direct and elastic impact against the housing portion.

In the vibration-damping device constructed according to the mode (1) of the invention, the independent mass member is displaced relative to the housing portion when a vibrational load is applied between the first and second mounting members and the elastic body undergoes elastic deformation or displacement thereof. In particular, upon application of a specific vibrational load whose frequency corresponds to a surging frequency of the elastic body, an amount of the elastic deformation or displacement of the elastic body increases, resulting in an increase in an amount of displacement of the independent mass member relative to the housing portion of the connecting portion of the elastic body. This effectively induces bouncing displacement of the independent mass member relative to the housing portion, whereby the independent mass member is brought into direct and elastic impact against the housing portion, repeatedly. This impact (abutting contact) of the independent mass member against the housing portion exhibits a vibration damping effect with respect to the elastic body, thereby attenuating an amount of vibration or oscillation of the elastic body. Accordingly, the vibration-damping device of this mode permits eliminating or reducing a problem of deterioration of its vibration damping capability (i.e., an increase of a ratio of vibration transmission) due to the surging of the elastic body, thus ensuring an excellent vibration damping capability thereof with respect to various kinds of vibrations over a wide frequency range with high stability. It should be appreciated that the term "connecting portion" should be interpreted to mean a part of the elastic body that extends between the first and second mounting members and is elastically deformed upon application of a vibrational load between the first and second mounting members.

The independent mass member is preferably made of a metallic material having a higher gravity. Alternatively, the independent mass member may possibly be made of a non-metallic material such as a rubber elastic body, a synthetic resin material and a foamed body of a rubber material or a synthetic resin material. It is possible to reinforce such a independent mass member made of the non-metallic material by fixing thereto a rigid member made of metal or the like.

It is noted that the vibration-damping device of this mode has no member to elastically connect the independent mass member and the housing portion with each other. Namely, an outer surface of the independent mass member is completely separated from an inner surface of the housing portion. With the independent mass member placed in a center of displacement thereof relative to the housing portion, the outer circumferential surface of the independent mass member and the inner circumferential surface of the housing portion are opposed to each other with a given spacing therebetween. Thus, the independent mass member is independently displaceable relative to the housing portion without being bonded to the housing portion.

(2) A vibration-damping device according to the above-indicated mode (1), wherein the housing portion formed in the connecting portion of the elastic body is located at a substantially central portion between the first mounting member and said second mounting member, in a direction in which the first and second mounting member are connected to each other via the connecting portion. The vibration-damping device of this mode of the invention, the housing portion is formed at the central portion of the connecting portion which corresponds to a loop of the first harmonic of the surging of the connecting portion of the elastic body, that is, the substantially central portion between the connecting ends of the connecting portion with respect to the first and second mounting members. Accordingly, the housing portion is likely to be subjected to vibration or oscillation having relatively large amplitude, thus effectively inducing the bouncing displacement of the independent mass member and assuring increased impact of the independent mass member against the housing portion. Thus, the vibration-damping device of this mode exhibits a desired effect for limiting or restricting the surging of the elastic body, on the basis of the impact of the independent mass member against the housing portion with high efficiency.

(3) A vibration-damping device according to the above-indicated mode (1) or (2), wherein the housing portion includes a rigid case member bonded by vulcanization to the elastic body. In the vibration-damping device of this mode of the invention, the rigid case member functions to prevent or limit deformation of a profile of the inner surface of the housing portion, when the elastic body undergoes elastic deformation due to a static and an active load applied to the vibration-damping device. That is, the use of the case member is effective to stabilize a desired spacing distance between abutting surfaces of the independent mass member and the housing portion, and amplitude of displacement of the independent mass member relative to the housing portion. Thus, the vibration-damping device of this mode of the invention is capable of exhibiting a desired surging limiting effect with respect to the elastic body thereof, on the basis of the impact of the independent mass member against the housing portion, with high stability.

(4) A vibration-damping device according to the above-indicated mode (3), wherein the case member includes an abutting surface adapted to impact against the independent mass member, and the abutting surface of the case member is covered by an abutting rubber layer integrally formed with the elastic body. The vibration-damping device constructed according to this mode of the invention makes it possible to eliminate or minimize impact noises generated upon impact of the independent mass member against the case member, while permitting the use of an independent mass member which is made of a rigid material such as metal and which is naked without being covered with an elastic layer. Since the abutting rubber layer is formed integrally with the elastic body, the abutting rubber layer is produced with high efficiency.

(5) A vibration-damping device according to any one of the above-indicated modes (1)–(4), wherein the connecting portion of the elastic body undergoes shear deformation thereof upon application of a vibrational load between said first and second mounting members, and the independent mass member is independently displaceable relative to and is brought into impact against the housing portion in a direction in which the connecting portion of the elastic body undergoes shear deformation. In the vibration-damping device according to this mode of the invention, the independent mass member is brought into impact against the housing portion in the direction in which the connecting portion of the elastic body undergoes the shear deformation, so that the housing portion is elastically displaced or oscillated with relatively large amplitude. Therefore, the vibration-damping device of this mode is capable of exhibiting a high surging limiting effect with respect to its elastic body, on the basis of the impact (abutting contact) of the independent mass member against the housing portion, thus effectively preventing the vibration-damping device suffering from deterioration of its vibration damping capability due to the surging of the elastic body thereof.

(6) A vibration-damping device according to the above-indicated mode (5), wherein the housing portion formed in the connecting portion of the elastic body is located at an intermediate portion between the first and second mounting members, and extends in a direction perpendicular to the direction in which the connecting portion of the elastic body undergoes shear deformation. This arrangement enables to obtain a sufficient volume of the housing portion, thus making it possible to obtain a sufficient volume of the independent mass member to be accommodated in the housing portion. Accordingly, the vibration-damping device of this mode can exhibit effectively the surging limiting effect with respect to its elastic body, on the basis of the impact (abutting contact) of the independent mass member against the housing portion.

(7) A vibration-damping device according to the above-indicated mode (6), wherein the independent mass member has an elongated shape and extends continuously in a longitudinal direction of the housing portion. This arrangement permits that the independent mass member is able to have a mass as much as possible within a predetermined amount of volume of the housing portion, thus assuring an enhanced surging limiting effect of the vibration-damping device on the basis of the impact of the independent mass member against the housing portion, with the housing portion made in compact in size.

(8) A vibration-damping device according to any one of the above-indicated modes (1)–(7), wherein the first mounting member comprises an inner shaft member and the second mounting member comprises an outer sleeve member disposed radially outward of the inner shaft member with a radial spacing therebetween, while the elastic body is interposed between the inner shaft member and the outer sleeve member. The elastic body has a pair of voids formed therethrough over an entire axial length thereof at respective portions opposed to each other in a diametric direction perpendicular to an axis of the inner shaft member in which a vibrational load is applied between the inner shaft member and said outer sleeve member, to thereby provide a pair of elastic connecting portions of the elastic body. The pair of elastic connecting portions elastically connect the inner shaft member and the outer sleeve member with each other in respective diametric directions perpendicular to the axis of the inner shaft member, and the housing portion being formed in each of the pair of the elastic connecting portions of the elastic body.

The vibration-damping device constructed according to the mode (8) of the invention ensures an increased ratio of the spring constants of the elastic body in the two mutually perpendicular diametric directions, namely, a first diametric direction in which the pair of voids are opposed to each other and a second diametric direction which is perpendicular to the first diametric direction. This leads to a high degree of freedom in tuning the spring characteristics of the vibration-damping device. Therefore, the vibration-damping device of this mode of the invention is suitably applicable to a suspension bushing or an engine mount for automotive vehicles. Moreover, the surging of the elastic body generated upon application of the specific-frequency vibration between the inner shaft member and the outer sleeve member is effectively limited on the basis of the impact of the independent mass members against the respective housing portions. That is, the above-indicated arrangement of the mode (8) of the invention makes it possible to provide a cylindrical elastic mount which is simple in construction and which is capable of exhibiting an excellent vibration damping effect with respect to input vibrations over a wide frequency range.

(9) A vibration-damping device according to the above-indicated mode (8), wherein each of the pair of elastic connecting portions has a through hole axially extending therethrough to thereby constitute the housing portion, while the independent mass member has a rod shape and is disposed in the respective through hole of each of the pair of the elastic connecting portions such that the independent mass member extends through the through hole and is provided with a projection for preventing a disengagement thereof from the through hole. This arrangement facilitates the impact of the independent mass member against the housing portion with high efficiency, during the surging of the elastic body in which the elastic body is likely to undergo shearing deformation with relatively large amplitude. The arrangement of the mode (9) makes it possible to provide effectively an elastic cylindrical mount which is capable of eliminating or reducing the deterioration of the vibration damping capability thereof due to the surging of the elastic body, while exhibiting an excellent vibration damping effect with respect to vibrations over a wide frequency range with high stability.

(10) A vibration-damping device according to any one of the above-indicated modes (1)–(9), wherein the second mounting member has a cylindrical portion, and the first mounting member is substantially coaxially disposed on one of axially opposite sides of the cylindrical portion of the second mounting member with an axial spacing therebetween, while the elastic body has a substantially tapered cylindrical shape and extends radially outwardly from the first mounting member to an open end portion of the cylindrical portion of the second mounting member so as to elastically connect the first mounting member and the cylindrical portion of the second mounting member. The open end portion of the cylindrical portion of the second mounting member is fluid-tightly closed by the elastic body to thereby form within the cylindrical portion of the second mounting member a fluid chamber partially defined by the elastic body and filled with a non-compressible fluid, so that the vibration-damping device exhibit a vibration damping effect on the basis of flows of the non-compressible fluid. The housing portion formed in the connecting portion of the elastic body is located at an intermediate portion between the first and second mounting members in a direction in which the first mounting member and the cylindrical portion of the second mounting member are connected to each other via the connecting portion, and extends in a circumferential direction of the elastic body.

The vibration-damping device constructed according to this mode (10) of the invention is able to exhibit an excellent elastic support capacity and an excellent vibration damping characteristics with respect to a vibrational load applied in an axial direction of the second mounting member in which the first and second mounting members are moved toward each other. For this reason, the vibration-damping device of this mode is suitably applicable to an engine mount for an automotive vehicle, for example. Further, the surging of the elastic body upon application of the vibrational load between the first and second mounting members is effectively limited on the basis of the impact of the independent mass member against the housing portion. Therefore, this arrangement of the mode of the invention enables to provide a non-cylindrical vibration-damping device which is simple in construction and which is capable of exhibiting an excellent vibration damping effect with respect to input vibrations over a wide frequency range.

(11) A vibration-damping device according to any one of the above-indicated mode (1)–(10) of the invention, wherein the housing portion includes a housing body member fixed to the elastic body and being open at an opening thereof in an surface of the elastic body, and a covering member adapted to cover the opening of the housing body member, while the independent mass member is accommodated within the housing body member whose opening is closed by the covering member fixed thereto. This arrangement of the mode (11) of the invention enables to easily manufacture a non-cylindrical vibration-damping device which is capable of exhibiting an excellent vibration-damping device with respect to vibrations whose frequencies correspond to the surging frequency of the elastic body.

In order to assure a desired surging limiting effect of a vibration-damping device according to the present invention, and a reduced impact noise upon impact of the independent mass member against the housing portion, at least one of abutting surfaces of the independent mass member and the housing portion may preferably have a Shore D hardness of 80 or lower, more preferably, within a range of 20–40, as measured in accordance with ASTM method D-2240.

For the above-mentioned improved surging limiting effect and the reduced impact noise, at least one of the abutting surfaces of the independent mass member and the housing portion is also arranged to have a modulus of elasticity within a range of $1–10^4$ MPa, more preferably, $1–10^3$ MPa, and a loss tangent is not less than $10^{-3}$, more preferably within a range of 0.01–10, preferably.

Preferably, the independent mass member in its single form has a mass within a range of 10–1000 g, more preferably within a range of 50–500 g. Namely, if the mass of the independent mass member is set to 1000 g or smaller, more preferably 500 g or smaller, the independent mass member is likely to excite its bouncing displacement upon elastic displacement of the elastic body. If the mass of the independent mass member is set to 10 g or more, more preferably 50 g or more, the vibration-damping device is able to effectively exhibit a desired surging limiting effect on the basis of the impact of the independent mass member against the housing portion. It should be appreciated that when the vibration-damping device includes a plurality of independent mass members, each of the plurality of independent mass members is preferably arranged to have a mass held within the above-indicated preferred range.

For ensuring an excellent surging limiting or vibration damping effect of the vibration-damping device of this invention, a spacing between the abutting surfaces of the independent mass member and the housing portion is preferably arranged such that the independent mass member is reciprocatory movable relative to the housing portion by a distance of 0.2–1.6 mm, more preferably 0.2–1.0 mm, in a direction in which a vibrational load is applied to the housing portion.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF PREFERRED EMBODIMENTS

Figure 1:
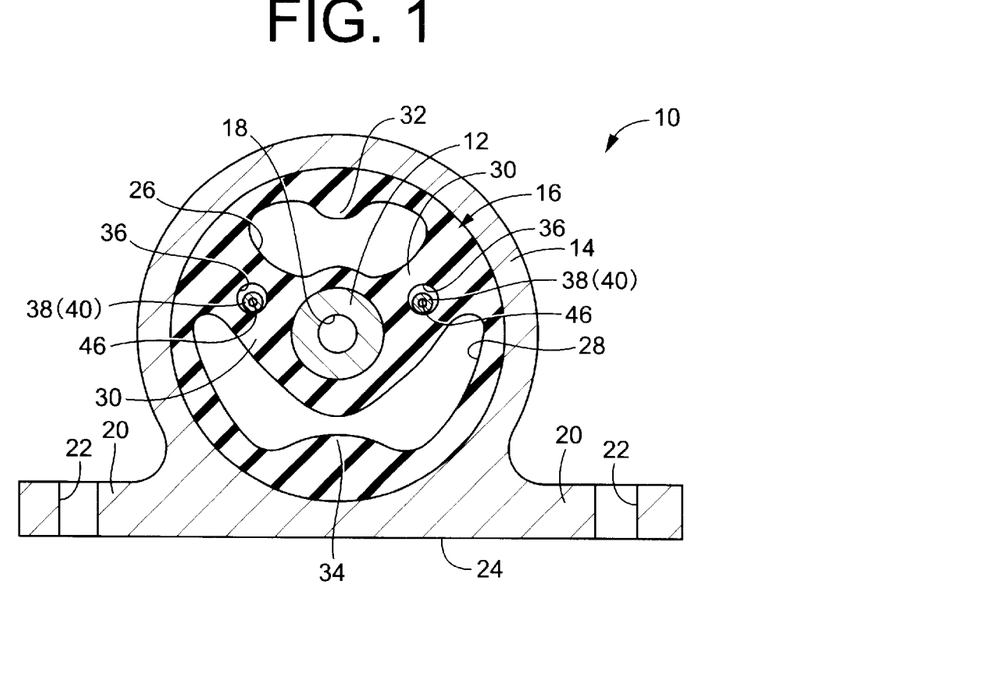
FIG. 1 is an elevational view in transverse cross section of a first embodiment of a vibration-damping device of the present invention in the form of an engine mount.

Referring first to FIG. 1, there is shown an engine mount 10 for an automotive vehicle, which is constructed according to a first embodiment of a vibration-damping device of the present invention. The engine mount 10 includes a first mounting member in the form of an inner shaft member 12 and a second mounting member in the form of an outer sleeve member 14 disposed radially outwardly of the inner shaft member 12 with a radial spacing therebetween. An elastic mount 16 is interposed between and elastically connecting the inner shaft member 12 and the outer sleeve member 14. The engine mount 10 is installed on the vehicle such that the inner shaft member 12 is attached to one of a power unit and a body of the vehicle (not shown), while the outer sleeve member 14 is attached to the other of the power unit and the body, so that the power unit is supported by the body of the vehicle via the engine mount 10 in a vibration damping or isolating fashion. When the engine mount 10 is installed on the vehicle as described above, a static load or weight of the power unit acts on the inner shaft member 12, with a result of an elastic deformation of the elastic body 16 so that the inner shaft member 12 is brought into a substantially coaxial or concentric relationship with the outer sleeve member 14 as shown in FIG. 1. The engine mount 10 is adapted to damp primarily a vibrational load applied in a diametric direction (in the vertical direction as seen in FIG. 1) in which the inner shaft member 12 and the outer circumferential sleeve 18 are offset from each other prior to the installation of the engine mount 10 on the vehicle. This diametric direction will be referred to as "a load-receiving direction" where appropriate.

Described in detail, the inner shaft member 12 is a thick-walled cylindrical member having a relatively small diameter and made of a rigid material such as an aluminum alloy. The inner shaft member is fastened to one of the power unit and the body of the vehicle by a bolt threaded into a bore 18 of the inner shaft member 12.

The outer sleeve member 14 is a generally thin-walled cylindrical member having a relatively large diameter and made of a rigid material such as an aluminum alloy. A pair of mounting plates 20, 20 are integrally formed at an outer circumferential surface of the outer sleeve member 14 so as to protrude outwardly from the outer sleeve member 14 in opposite directions of a straight line tangent to the outer circumferential surface of the outer sleeve member 14. The integrally formed mounting plates 20, 20 have threaded holes 22, 22 formed therethrough, respectively. The mounting plates 20, 20 cooperate to constitute a mounting surface 24 which is approximately flat. With the outer sleeve member 14 is superposed on the other of the power unit and the body of the vehicle at its mounting surface 24, mounting bolts are threaded into the threaded holes 22, 22, thus fastening the outer sleeve member 14 the other of the power unit and body of the vehicle.

The elastic body 16 is interposed between the inner shaft member 12 and the outer sleeve member 14 which are opposed to each other in a radial direction thereof. The elastic body 16 has a generally thick-walled cylindrical shape, and bonded at its inner circumferential surface to an outer circumferential surface of the inner shaft member 12, and at its outer circumferential surface of an inner circumferential surface of the outer sleeve member 14, in the process of vulcanization of a rubber material for forming the elastic body 16. Thus, it is provided an integrally vulcanized assembly consisting of the inner shaft member 12, the outer sleeve member 14 and the elastic body 16.

The elastic body 16 includes a first void 26 and a second void 28 which are formed through respective circumferential portions of the elastic body 16 over an entire axial length of the elastic body 16. The first and second voids 26, 28 are opposed to each other in the load receiving direction (i.e., the vertical direction as seen in FIG. 1). The first void 26 extends with a generally elliptical cross sectional shape, while the second void 28 extends with a generally crescent cross sectional shape.

The first and second voids 26, 28 divide the elastic body 16 into two sections, namely a connecting portion in the form of a pair of elastic connecting portions 30, 30 extending between and connecting the inner shaft member 12 and the outer sleeve member 14, and the other part of the elastic body 16 which is substantially connected only to the outer sleeve member 14, and spaced apart from the inner shaft member 12. In this condition, the inner shaft member 12 and the outer sleeve member 14 are elastically connected substantially only by the pair of elastic connecting portions 30, 30 which extend in an axial direction of the elastic body 16 with a substantially constant transverse cross sectional shape, i.e., a V-shape as shown in FIG. 1.

The pair of elastic connecting portions 30, 30 extend in respective radial directions with a substantially constant cross-sectional shape between the inner shaft member 12 and the outer sleeve member 14. The pair of elastic connecting portions 30, 30 cooperate to form the above-indicated V-shape in the transverse cross section, which V-shape expands in a direction in which the inner shaft member 12 is displaced relative to the outer sleeve member 14 with the radial static load acting thereto upon installation of the engine mount 10 on the vehicle. This arrangement is effective to reduce or prevent occurrence of tensile stress in the elastic connecting portions 30, 30 when the vibrational load is applied to the engine mount 10 in the load receiving direction.

A stop part 32 integrally formed with the elastic body 16 is formed in a circumferentially central portion of the inner surface of the first void 26 so as to extend radially inwardly from the outer sleeve member 14 toward the inner shaft member 12. On the other hand, a stop part 34 integrally formed with the elastic body 16 is formed in a circumferentially central portion of the inner surface of the second void 28 so as to extend radially inwardly from the outer sleeve member 14 toward the inner shaft member 12. Upon application of the vibrational load to the engine mount 10, the inner shaft member 12 and the outer sleeve member 14 are brought into abutting contact with each other via the stop parts 32, 34, thus limiting an amount of relative displacement of the inner shaft member 12 and the outer sleeve member 14 in the load receiving direction (i.e., the vertical direction as seen in FIG. 1).

The pair of elastic connecting portions 30, 30 have respective hollow housing portions in the form of through holes 36, 36. Each of the through holes 36 is formed through an approximately radially and circumferentially central portion of the corresponding elastic connecting portion 30 over an entire axial length of the elastic connecting portion 30. The each through hole 36 extends straightly and parallel to the axis of the inner shaft member 12 and the outer sleeve member 14 with a substantially constant circular cross sectional shape. The each through hole 36 has an inner diameter which is sufficiently smaller than a circumferential dimension or width of the corresponding elastic connecting portion 30, preferably which is held within a range of about one-tenth (⅒) through two-thirds (⅔) of the circumferential width of the corresponding elastic connecting portion 30. The thus formed through holes 36, 36 of the pair of the elastic connecting portions 30, 30 accommodate independent mass members 38, 38, respectively.

Figure 2:
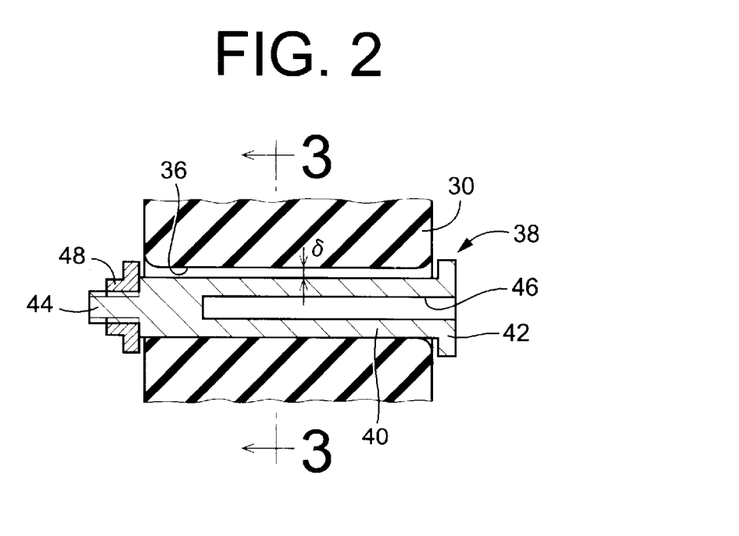
FIG. 2 is a fragmentally enlarged view of a primary part of the engine mount of FIG. 1.
Figure 3:
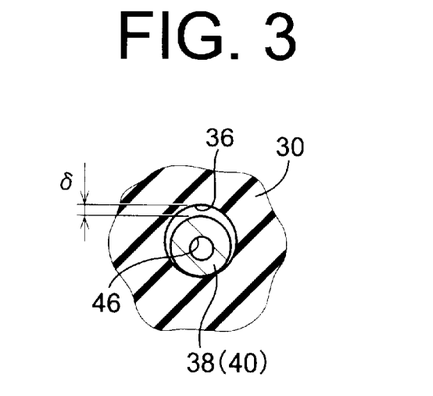
FIG. 3 is a cross sectional view taken along line 3—3 of FIG. 2.

Referring next to FIGS. 2 and 3, each independent mass member 38 is made of a metallic material such as steel, and include a body portion 40 having a generally circular rod shape with a circular cross sectional shape which is constant over its entire axial length. The body portion 40 of the each independent mass member 38 has an axial length slightly larger than the axial length of the corresponding through hole 36 in which the independent mass member 38 is accommodated. The each independent mass member 38 has at one of its axially opposite ends a large diameter portion 42 whose diameter is larger than that of the body portion 40 and at the other of its axially opposite ends a small diameter portion 44 whose diameter is smaller than that of the body portion 40 and having an outer circumferential surface on which an external thread is formed. The each independent mass member 38 further has a cavity 46 open in a central portion of an end face of the large diameter portion 42 and extending straightly in its axial direction with a constant circular cross sectional shape with an axial length more than a half of the axial length of the independent mass member 38. The cavity 46 is formed in order to adjust the weight of the independent mass member 38.

The each independent mass member 38 extends through the through hole 36 of the corresponding elastic connecting portion 30 with its small diameter portion 44 protrudes axially outwardly from the corresponding end of the through hole 36. A nut 48 is threaded engaged with the small diameter portion. Since the large diameter portion 42 and the nut 48 have respective outer diameters which is made larger than the inner diameter of the through hole 36, an disengagement of the independent mass member 38 from the through hole 36 is prevented by abutting contact of the large diameter portion 42 and the nut 48 with the respective axially opposite end faces of the corresponding elastic connecting portion 30.

As is understood from the aforementioned description, the large diameter portion 42 and the nut 48 function as a projection, and an inner circumferential surface of the through hole 36 serves as an housing portion in the present embodiment.

The body portion 40 of the each independent mass member 38 has an outer diameter which is made slightly smaller than the inner diameter of the corresponding through hole 36. Namely, the independent mass member 38 is accommodated in the through hole 36 of the corresponding elastic connecting portion 30 with a spacing therebetween. With the independent mass member 38 and the through hole 36 are placed in a substantially coaxial or concentric relation with each other, the outer circumferential surface of the body portion 40 of the independent mass member 38 are opposed to the inner circumferential surface of the through hole 36 with a substantially constant radial spacing therebetween over its entire circumference. This arrangement permits the independent mass member 38 to displace independently in the radial direction relative to the elastic connecting member 38 which defines the inner circumferential surface of the through hole 36. In this respect, the large diameter portion 42 and the nut 48 fixed to the axially opposite end portions of the independent mass member 38 are opposed to the respective axially opposite end faces of the corresponding elastic connecting portion 30 with a suitable axial spacing therebetween. This axial spacing distance is determined so as not to interrupt the desired radial displacement of the independent mass member 38 relative to the corresponding elastic connecting portion 30.

In the static state of the engine mount 10 as shown in FIGS. 2 and 3, where no vibration is applied to the engine mount 10, the each independent mass member 38 is held in contact with the lower surface of the corresponding through hole 36 due to gravity acted thereto, and are spaced apart from the upper surface of the through hole 36 with a predetermined radial spacing "δ" therebetween. The dimension of the radial spacing "δ" is held within a range of 0.2–1.6 mm, more preferably within a range of 0.2–1.0 mm. In other words, the difference (Db–Da) between the outer diameter: Da of the body portion 40 of the independent mass member 38 and the inner diameter: Db of the through hole 36 is held within a range of 0.2–1.6 mm, more preferably, within a range of 0.2–1.0 mm. This permits a radially reciprocating motion of the independent mass member 38 by a distance within a range of 0.2–1.6 mm, more preferably within a range of 0.2–1.0 mm.

A material for forming the pair of the elastic connecting portions 30, 30 defining the inner (wall) surface of the through hole 36, i.e., the elastic body 16, may be selected from various kinds of known rubber materials having a Shore D hardness of 80 or lower, more preferably, within a range of 20–40, as measured in accordance with ASTM method D-2240.

In the engine mount 10 constructed according to the present embodiment as described above, the pair of elastic connecting portions 30, 30 of the elastic body 16 are elastically deformed upon application of the vibrational load between the inner shaft member 12 and the outer sleeve member 14.

The elastic deformation of the elastic connecting portions 30, 30 includes compression deformation thereof in diametric directions of the inner shaft member 12 and the outer sleeve member 14, and shear deformation in a circumferential direction of the inner shaft member 12 and the outer sleeve member 14. Since a spring constant of the each elastic connecting portion 30 is made relatively small in the circumferential direction in which the elastic connecting portion 30 is subjected to the shear deformation (hereinafter referred to as a "shearing direction"), the surging frequency of the elastic connecting portion 30 is likely to correspond to a frequency band of vibrations to be damped in the vehicle. That is, the each elastic connecting portion 30 has a first harmonic natural frequency: fn as measured in the shearing direction, which is obtained by the following equation (1):

$$fn = (1/2L)\sqrt{(K/M)} \qquad (1)$$

where,
L: effective free length of the elastic connecting portion 30;
M: effective mass per unit diametric length; and
K: dynamic shearing spring constant of the elastic body 16 (the elastic connecting portion 30).

In the engine mount 10 constructed as described above, the inner shaft member 12 and the outer sleeve member 14 are elastically connected with each other substantially only by the pair of the elastic connecting portions 30, 30, so that the elastic deformation of the pair of the elastic connecting portions 30, 30 has a great influence on a vibration damping capability of the engine mount 10. Therefore, the surging of the elastic connecting portions 30, 30 and a resultant increased amplitude of the elastic deformation of the elastic connecting portions 30, 30 may directly deteriorate the vibration damping capability of the engine mount 10 at a specific frequency band, i.e., the surging frequency band.

In the engine mount 10 constructed according to the present embodiment, the elastic deformation of the pair of the elastic connecting portions 30, 30 cause somewhat deformation or displacement of the inner circumferential surfaces of the respective through holes 36, 36. In this respect, the central portion of the elastic connecting portions 30, which defines the inner circumferential surface of the corresponding through hole 36, are likely to be subjected to the shearing deformation, rather than the compression deformation. It is therefore possible to reduce or minimize an amount of the elastic deformation of the inner circumferential surface of the through hole 36, in comparison with the case where the central portion of the elastic connecting portion 30 is subjected to the compression deformation. Thus, the each elastic connecting portion 30 is elastically deformed with the cylindrical cross sectional shape of the through hole 36 held in its original shape. The radial spacing "δ" between the inner circumferential surface of the through hole 36 and the outer circumferential surface of the independent mass member 38 are substantially held in constant during the elastic deformation of the elastic connecting portion 30.

Where the surging of the each elastic connecting portion 30 causes an oscillation of the elastic connecting portion with a relatively large amplitude, an external force applied to the independent mass member 38 from the elastic connecting portion 30 in the radial direction is increased, thus exciting displacement or bouncing movement of the independent mass member 38 relative to the through hole 36. As a result, the independent mass member 38 and the through hole 36 as a housing portion are brought into direct and elastic impact against each other repeatedly in the shearing direction, i.e., the surging direction of the each elastic connecting portion 30. The repeated impact of the independent mass member 38 with respect to the inner circumferential surface of the through hole 36 exhibits an oscillating limiting effect or an amplitude minimizing effect with respect to elastic periodic displacement (vibrational displacement of the corresponding elastic connecting portion 30, thus effectively limiting or restricting the surging of the each elastic connecting portion 30, i.e., the elastic body 16.

Therefore, the engine mount 10 constructed according to the present embodiment is capable of preventing or minimizing the deterioration of the vibration damping capability thereof due to the surging of the elastic body 16 at the specific frequency band. This enables the engine mount 10 to exhibit a desired vibration damping effect on the basis of the elastic characteristics of the elastic body 16 with respect to input vibrations over a wide frequency range with high stability.

In particular, the each through hole 36 accommodating the each independent mass member 38 is formed through the radially central portion of the corresponding connecting portion 30, in the present embodiment. That is, the each through hole 36 is located in a portion corresponding to a loop of the first harmonic of the surging of the corresponding elastic connecting portion 30, so that the through hole 36 is subjected to a relatively large vibration upon surging of the elastic connecting portion 30. This arrangement efficiently facilitates the bouncing displacement of the each independent mass member 38, thus ensuring high surging limiting effect of the engine mount 10 on the basis of the impact (abutting contact) of the independent mass members 38 against the through holes 36.

In the present embodiment, the inner circumferential surface of the each through hole 36 has a cylindrical shape, while the outer circumferential surface of the body portion 40, i.e., an abutting surface of the each independent mass member 38 has a cylindrical shape, too. This enables the body portion 40 of the each independent mass member 38 to directly and elastically impact against the inner circumferential surface of the corresponding through hole 36 in every radial direction with a substantially same condition. Accordingly, the engine mount 10 of the present invention is able to effectively exhibit a desired surging limiting effect even if a direction of the elastic deformation of the each elastic connection portions 30, 30 inclines with respect to the shear direction of the each elastic connecting portion 30 due to an composition of the shear deformation component and the compression deformation component of the elastic deformation of the each elastic connecting portion 30.

Figure 4:
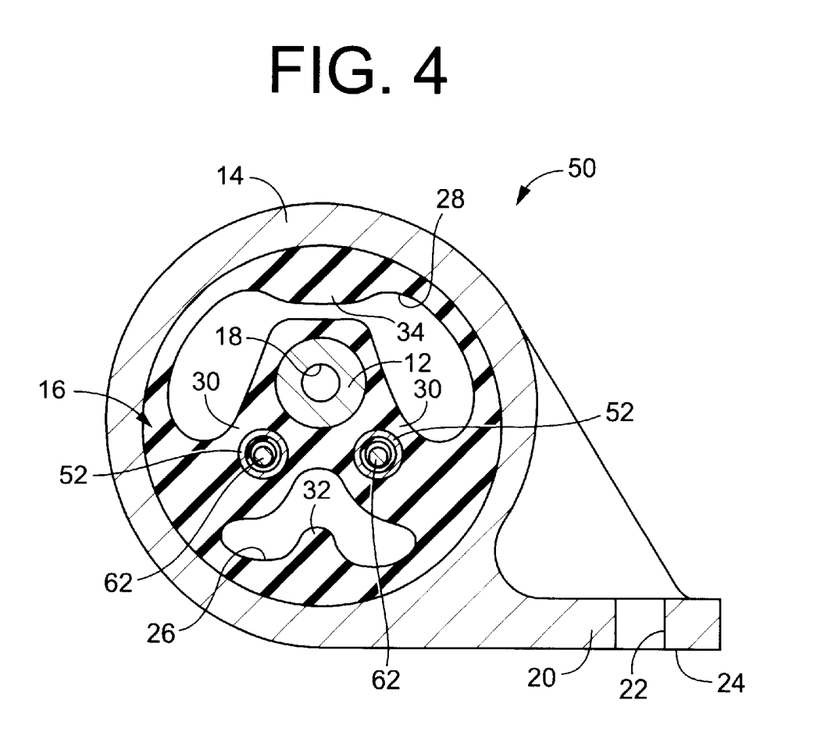
FIG. 4 is an elevational view in transverse cross section of a second embodiment of the vibration-damping device of the present invention in the form of an engine mount.

Referring next to FIG. 4, there is shown an engine mount 50 for an automotive vehicle, which is constructed according to a second embodiment of the present invention. The same reference numerals as used in the first embodiment will be used in this embodiment, to identify the functionally corresponding or structurally similar elements, which will not be described in detail to avoid redundancy of description.

Figure 5:
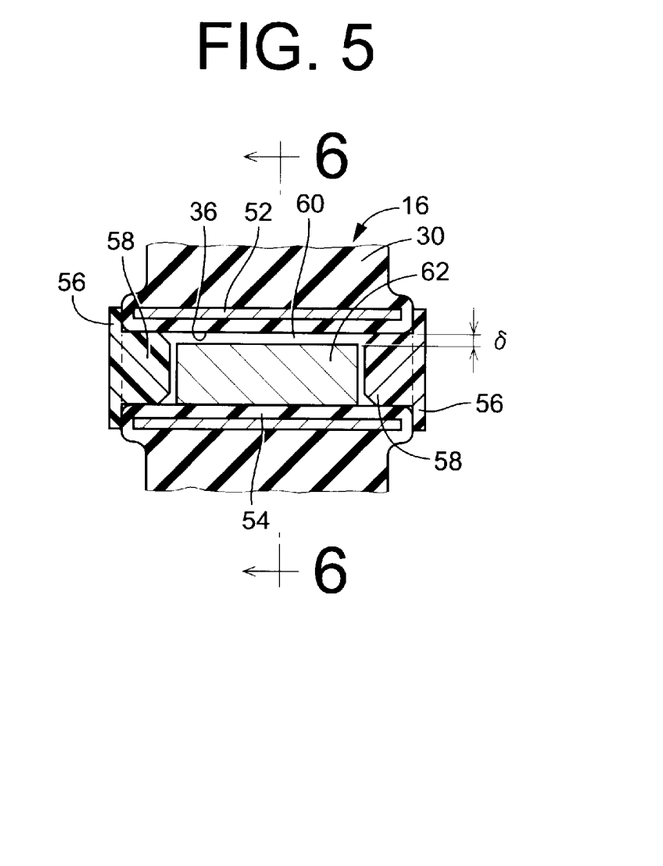
FIG. 5 is a fragmentally enlarged view of a primary part of the engine mount of FIG. 4.
Figure 6:
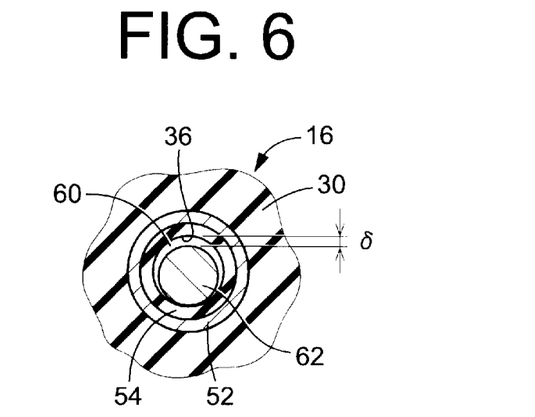
FIG. 6 is a cross sectional view taken along line 6—6 of FIG. 5

The engine mount 50 of the present embodiment includes rigid case members in the form of metallic sleeves 52, 52 disposed around the through holes 36, 36 formed through the respective elastic connecting portions 30, 30. Each of the metallic sleeves 52 is a thin-walled cylindrical member made of metallic materials having rigidity larger than at least that of the elastic body 16, e.g., iron and an aluminum alloy. The each metallic sleeve 52 has an axial length substantially equal to or slightly larger than that of the corresponding elastic connecting portion 30, so that the metallic sleeve 52 reinforces the inner circumferential surface of the through hole 36 over a substantially entire axial length of the through hole 36. The metallic sleeve 52 has an inner diameter which is made larger by a predetermined amount than the inner diameter of the metallic sleeve 52. The thus formed each metallic sleeve 52 is substantially coaxially disposed around the corresponding through hole 36 such that the metallic sleeve 52 is embedded in the elastic body 16. That is, the elastic body 16 extends into an inside of the metallic sleeve 52 so as to form an abutting rubber layer 54 extending over an inner circumferential surface of the metallic sleeve 52 with a substantially constant thickness. The abutting rubber layer 54 is bonded to the inner circumferential surface of the metallic sleeve 52 in the process of vulcanization of the rubber material for forming the elastic body 16. In this arrangement, the metallic sleeve 52 substantially defines a circumferential wall portion of the through hole 36, thus ensuring a high rigidity of the circumferential wall portion of the through hole 36. Further, the inner circumferential surface of the through hole 36 is constituted by the abutting rubber layer 54 fixed on the inner circumferential surface of the metallic sleeve 52.

A pair of covering members 56, 56 is fitted into an axially opposite open end portions of the through hole 36. Each of the covering members 56, 56 is a circular disk-shaped member made of an elastic material such as a synthetic resin material or a rigid material. A circular projection 58 is integrally formed on and protrudes axially outwardly from one of axially opposite major surfaces with a profile corresponding to the corresponding open end portion of the through hole 36. The thus formed covering members 56, 56 are press-fitted into and fixed to the respective open end portions of the through hole 36, thus closing the opening of the through hole 36 to form therein an accommodation space 60 independent of the external area. A material for forming the covering members 56, 56 may preferably have a Shore D hardness of 80 or lower, more preferably, within a range of 20–40, as measured in accordance with ASTM method D-2240.

As is understood from the aforementioned description, the circumferential wall portion of the through hole 36 including the metallic sleeve 52 and the covering member 56, 56 cooperate to constitute the housing portion in the present embodiment.

Like the engine mount 10 of the first embodiment, each of the accommodation spaces 60, 60 accommodates one independent mass member 62. The each independent mass member 62 is a solid circular rod-shaped member made of a rigid material such as metal, and extends straightly in its axial direction with a substantially constant cross sectional shape over its entire axial length. The each independent mass member 62 has an outer diameter and an axial length which are made slightly smaller than those of the corresponding accommodation space 60.

With the each independent mass member 62 substantially coaxially disposed in the corresponding accommodation space 60, an outer circumferential surface of the independent mass ember 62 and an inner circumferential surface of the accommodation space 60, i.e., the surface of the abutting rubber layer 54 are radially opposed to each other with a predetermined radial spacing therebetween, which is substantially constant over an entire circumference of the independent mass member 62, like in the engine mount 10 of the first embodiment. In this condition, therefore, the dimension of the radial spacing "δ/2" is held within a range of 0.1–0.8 mm, more preferably within a range of 0.1–0.5 mm. The each independent mass member 62 is opposed at its axially opposite end faces to protruding end faces of the cylindrical projections 58 of the respective covering members 56, 56 with a predetermined axial spacing which is suitably dimensioned so as not to interrupt a desired displacement of the independent mass member 62 in its radial direction.

Where the engine mount 50 experiences the surging of the elastic body 16, which causes an elastic displacement or oscillation of the elastic body 16 in a direction in which the elastic body 16 undergoes a shearing deformation, the independent mass members 62, 62 are displaced bouncingly within the respective accommodation spaces 60, 60, and accordingly impact against the circumferential wall portion of the respective through holes 36, 36 which partially define the accommodation spaces 60, 60, respectively. Therefore, the engine mount 50 exhibits a desired surging limiting effect with respect to the elastic body 16, on the basis of the respective impact of the independent mass members 62, 62 against the cylindrical wall portions of the through holes 36, 36. This makes it possible to reduce or minimize an amount of the vibrational load transmitted from the power unit to the body of the vehicle when the engine mount 50 is subjected to vibrations whose frequency is within the surging frequency band of the elastic body 16 thereof. Thus, the engine mount 50 is capable of exhibiting a desired vibration damping capability with respect to input vibrations over a wide frequency range.

In the present engine mount 50, particularly, the metallic sleeves 52, 52 are embedded around the through holes 36, 36, respectively, thus preventing the elastic deformation of the accommodation spaces 60, 60, upon application of the vibrational load to the elastic connecting portions 30, 30. Accordingly, the engine mount 50 permits the desired surging limiting effect on the basis of the repeated impact of the independent mass members 62, 62 against the respective cylindrical wall surfaces of the through hole 36, with high stability and with high efficiency.

Figure 7:
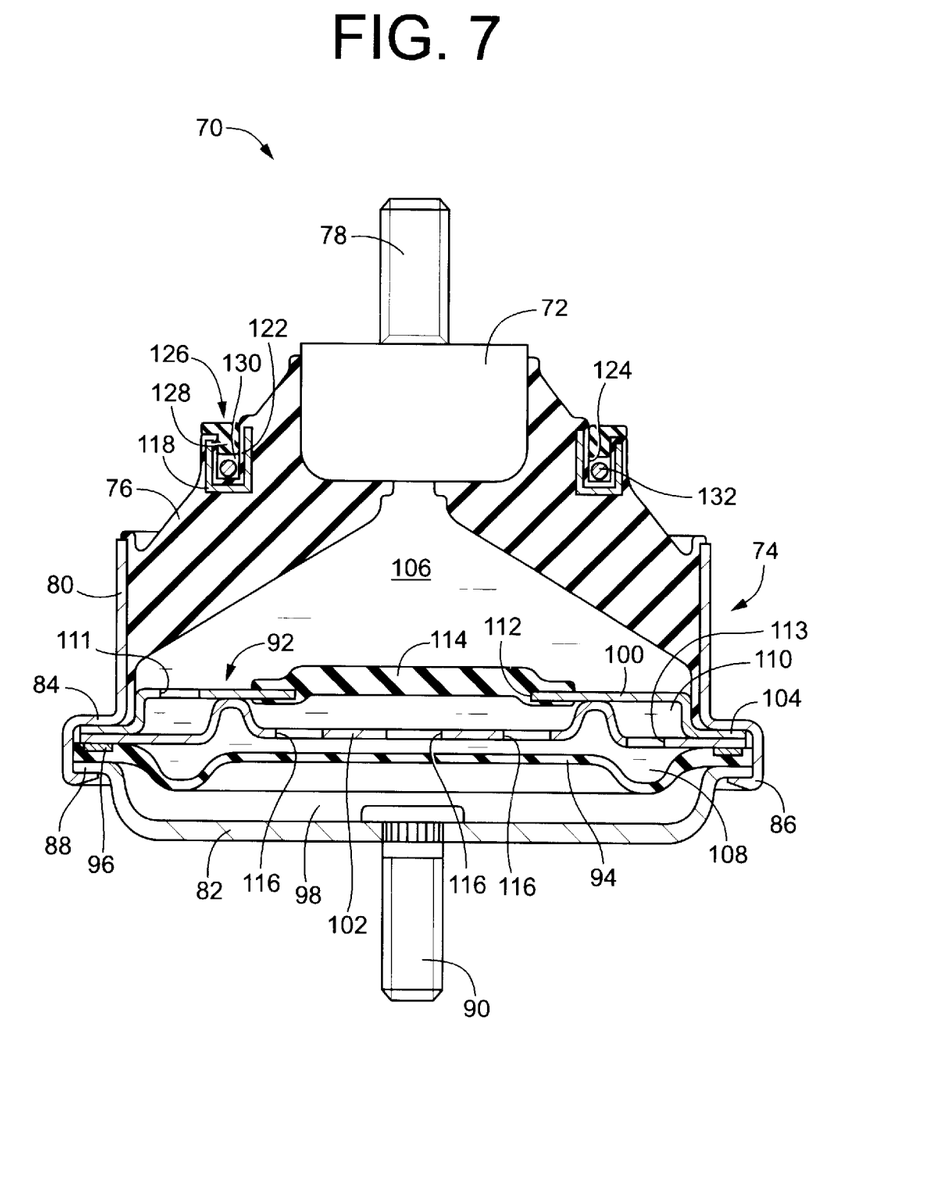
FIG. 7 is an elevational view in axial or vertical cross section of a third embodiment of the vibration-damping device of the present invention in the form of an engine mount.

Referring next to FIG. 7, there is shown an engine mount 70 for an automotive vehicle, constructed according to a third embodiment of the present invention. The engine mount 70 includes a first mounting member 72 and a second mounting member 74 which are disposed mutually spaced apart relationship with each other and an elastic body 76 elastically connecting the first and the second mounting members 72, 74. The first and second mounting members 72, 74 are both made of a metallic material, and are attachable to a power unit and a body of a the vehicle, respectively, for thereby mounting the power unit on the body of the vehicle in a vibration damping fashion. The engine mount 70 primary receives a vibrational load in an axial or a vertical direction as seen in FIG. 7, which is hereinafter referred to as a load receiving direction where appropriate. In the following description, the terms "upper" and "lower" are basically used on the basis of the vertical or elevational direction of FIG. 7.

The first mounting member 72 is a circular disk shaped member having a relatively large thickness and includes a first mounting bolt 78 secured to its central portion so as to extend in the axially upward direction. The first mounting member 72 is fixed with the first mounting bolt 78 to the power unit.

The second mounting member 74 includes a cylindrical wall member 80 and a bottom wall member 82, which are both made of metal. The cylindrical wall member 80 has a large diameter hollow cylindrical shape. The cylindrical wall member 80 has a shoulder portion 84 at its axially intermediate portion and a large-diameter caulked portion 86 located on the axially lower side of the shoulder portion 84 and formed as an integral part of the cylindrical wall member 80. The bottom wall member 82 is a shallow cylindrical cup shaped member, and has an outward flange portion 88 integrally formed at its upper open end so as to extend radially outwardly. The cylindrical wall member 80 and the bottom wall member 82 are superposed on each other in the axial or vertical direction, and the caulked portion 86 of the cylindrical wall member 80 is caulked against the outward flange portion 88 of the bottom wall member 82, so as to integrally constitute the second mounting member 74 having a generally cylindrical cup shape. The bottom wall member 82 has a second mounting bolt 90 secured to its central portion so as to extend in the axially downward direction. The bottom wall member 82, in other words, the second mounting member 74 is fixed with the second mounting bolt 90 to the body of the vehicle.

The first mounting member 72 is disposed above the second mounting member 74 such that the first mounting member 72 is opposed to and spaced apart from the second mounting member in the axial direction with a predetermined axial or vertical spacing therebetween. The elastic body 76 is interposed between the two mounting members 12, 14 for elastic connection therebetween.

The elastic body 76 has a hollow frusto-conical shape with a relatively large wall thickness. The elastic body 76 is bonded at its small diameter portion to the first mounting member 72 such that the first mounting member 72 is embedded into the small diameter portion, and at its large diameter portion to the second mounting member 74 such that an outer circumferential surface of the large diameter portion of the elastic body 76 is secured to an inner circumferential surface of the cylindrical wall member 80, in the process of vulcanization of a rubber material to form the elastic body 76. Thus, there is formed an integral vulcanized assembly constituted by the elastic body 76, the first mounting member 72 and the cylindrical wall member 80 of the second mounting member 74. It is noted that the elastic body 76 serves as a connecting portion in its entirety in the present embodiment.

With the elastic body 76 bonded by the above-indicated vulcanized process to the first and second mounting members 72, 74, an opening of the second mounting member 74 is fluid tightly closed by the elastic body 76. The second mounting member 74 accommodates a partition structure 92 and a flexible diaphragm 94 in its hollow interior space such that the partition structure 92 and the flexible diaphragm 94 extends in a radial direction perpendicular to the axial direction of the second mounting member 74.

The flexible diaphragm 94 is a thin-walled circular member formed of an easily deformable rubber elastic layer. The flexible diaphragm 94 is bonded at its peripheral portion to an annular fixing ring 96 in the process of vulcanization of a rubber material for forming the flexible diaphragm 94. There is a given radial slack in the flexible diaphragm 94 so as to permit an elastic deformation of the flexible diaphragm 94 with ease.

The fixing ring 96 is fixedly gripped by and between the cylindrical wall member 80 and the bottom wall member 82 so that the flexible diaphragm 94 is fixedly supported at its peripheral portion by the second mounting member 74. The thus assembled flexible diaphragm 94 fluid-tightly closes the lower opening of the cylindrical wall member 80 of the second mounting member 74, thereby forming a fluid-tightly closed chamber within the cylindrical wall member 80, which is partially defined by and between the elastic body 76 and the flexible diaphragm 94, and which is filled with a non-compressible fluid. An air chamber 98 partially defined by the bottom wall member 82 is formed on the lower side of the flexible diaphragm 94 remote from the fluid chamber, so as to permit a displacement or deformation of the flexible diaphragm 94.

The partition structure 92 includes a closure member 100 and an orifice member 102, which are made of metallic materials. The closure member 100 is an inverted shallow cup-shaped member having an outward flange portion 104 integrally formed at its open-end portion. The closure member 100 is superposed on the orifice member 102 having a generally circular disk-like shape. The peripheral portion of the orifice member 102 and the outward flange portion 104 of the closure member 100 are superposed on each other and fluid-tightly gripped by and between the cylindrical wall member 80 and the bottom wall member 82. That is, the partition structure 92 is fixedly supported at its peripheral portion by the second mounting member 74.

The partition structure 92 fluid tightly divides the fluid chamber into two sections disposed on the axially opposite sides, namely, a pressure-receiving chamber 106 formed on the upper side thereof as seen in FIG. 1 and partially defined by the elastic body 76, and an equilibrium chamber 108 formed on the lower side as seen in FIG. 1 and partially defined by the flexible diaphragm 94. Upon application of a vibrational load to the engine mount 70, the pressure in the pressure-receiving chamber 106 changes due to the elastic deformation of the elastic body 76, while the volume of the equilibrium chamber 108 is permitted to vary by displacement of the flexible diaphragm 94.

The closure member 100 and the orifice member 102 cooperate to define therebetween an orifice passage 110 formed in the outer circumferential portions thereof and extending in the circumferential direction. One of opposite end of the orifice passage 110 is open to the pressure-receiving chamber 106 through a communication hole 111 formed through the closure member 100, and the other end of the orifice passage 110 is open to the equilibrium chamber 108 through a communication hole 113 formed through the orifice member 102. Thus, the pressure-receiving chamber 106 and the equilibrium chamber 108 are held in fluid communication through the orifice passage 110. In the present embodiment, the orifice passage 110 is tuned so that resonance or flows of the fluid through the orifice passage 110 exhibits an excellent vibration damping effect with respect to low frequency vibrations such as engine shakes.

The closure member 100 has a circular opening 112 formed through its central portion in which a movable rubber plate 114 is disposed. The movable rubber plate 114 has a circular disk-like shape with a substantially constant thickness, and disposed within the opening 112 so as to extend in the radial direction of the closure member 100. The movable rubber plate 114 is bonded at its peripheral portion to the inner peripheral portion of the closure member 100 (i.e., the peripheral portion of the opening 112), in the process of vulcanization of a rubber material for forming the movable rubber plate 114. That is, the movable rubber plate 114 is fixedly supported by the peripheral portion of the opening 112 over its entire circumference, with the movable rubber plate 114 horizontally extend without no slug as seen in FIG. 7, whereby the opening 112 of the closure member 100 is fluid-tightly closed by the movable rubber plate 114. On the other hand, the orifice member 102 has a plurality of through holes 116 formed through its central portion. The through holes 116 allows the fluid to flow therethrough between the pressure receiving chamber 106 and the equilibrium chamber 108 on the basis of a displacement of the movable rubber plate 114. The movable rubber plate 114 exhibits a suitable elastic force thereof so that an amount of flows of the fluid through the through holes 116 is desirably limited. In the present embodiment, the movable rubber plate 114 is tuned so as to be movable rubber plate 114 is movable upon application of the intermediate frequency vibrations such as an engine idling vibration in order to absorb a pressure change of the pressure-receiving chamber 106. Thus, the engine mount 70 exhibits a sufficiently low dynamic spring constant with respect to the intermediate-frequency vibrations.

The elastic body 76 partially defining the pressure receiving chamber 106 is provided with a housing body member in the form of a housing case 118. The housing case 118 is a large-diameter annular member made of a rigid material such as metal and having a circumferential groove open in its upper end surface and circumferentially extending with a constant rectangular cross section over its entire circumference. The housing case 118 has an outer diameter which is made smaller than the outer diameter of the cylindrical wall member 80, and has an inner diameter which is made larger than the outer diameter of the first mounting member 72. The housing case 118 has an axial length (thickness), which is made smaller than an axial length (thickness) of the elastic body 76 as measured at a radial portion in which the housing case 118 is disposed. Preferably, the axial length of the housing case 118 is held within a range between one-fifth ($\frac{1}{5}$) through one-second ($\frac{1}{2}$) of the axial length of the radial portion of the elastic body 76. This is effective to sufficiently assure desired elastic characteristics of the elastic body 76, even in the case where the housing case 118 is embedded in the elastic body 76.

The housing case 118 is disposed and open in an outer circumferential surface of the elastic body 76 such that the housing case 118 is located at an intermediate portion of a connecting portion of the elastic body 76 extending between the first and second mounting members 72, 74 in a direction in which the first and second mounting members 72, 74 are opposed to each other, in other words, in a direction in which the elastic body 76 extends straightly between the connecting portions of the first and second mounting members 72, 74 with an effective free length. The housing case 118 is disposed coaxially with the cylindrical wall member 80 with its open-end oriented toward the upper side of engine the mount 70. The bottom portion of the housing cases 118 is embedded into and bonded to the elastic body 76 by a given axial distance, in the above-indicated vulcanization process of the rubber material for forming the elastic body 76. That is, the housing case 118 is located in the intermediate portion of the elastic body 76 interposed between the first and second mounting members 72, 74 in a substantially radial direction in which the two mounting members 72, 74 are opposed to and connected with each other, while being partially embedded into and fixed to the outer circumferential surface of the elastic body 76.

The elastic body 76 extends into an inside of the housing case 118 and is bonded to an inner surface of the housing case 118, to thereby form an abutting rubber layer 122 extending over an entire area of the inner surface of the housing case 118 with a substantially constant thickness, for covering the inner surface of the housing case 118. With the housing case 118 assembled with the elastic body 76 as described above, an accommodation groove 124 is formed in the substantially central portion of the effective free length of the elastic body 76 such that the accommodation groove 124 is open in the outer circumferential surface and extends in the circumferential direction with the substantially constant rectangular cross sectional shape. The abutting rubber layer 122 is preferably arranged to have a Shore D hardness of 80 or lower, more preferably, within a range of 20–40, as measured in accordance with ASTM method D-2240, while taking into account the presence of the housing case 118 disposed behind the abutting rubber layer 122.

The opening of the accommodation groove 124 is closed by a covering member 126. More specifically described, the covering member 126 has an annular shape which is substantially corresponding to the profile of the opening of the accommodation groove 124 in its entirety. The covering member 126 has an annular protrusion 128 integrally formed at its lower surface so as to protrude axially downwardly as seen in FIG. 1. The covering member 126 is firmly fixed to the accommodation groove 124 with the annular protrusion 128 press-fitted into the accommodation groove 124. With the opening of the accommodation groove 124 closed as described above, there is provided an accommodation space 130 partially defined by the accommodation groove 124 and being independent of the external space.

As is understood from the aforementioned description, the housing case 118 and the covering member 126 cooperate to constitute the housing portion.

An independent mass member 132 is accommodated in the accommodation space 130. The independent mass member 132 is a ring member made of a rigid material such as metal and extending in the circumferential direction with a substantially constant circular cross sectional shape. With the independent mass member 132 is placed in a generally central portion of the accommodation space 130, the outer circumferential surface of the independent mass member 132 is opposed to a circumferential wall portion of the accommodation space 130 with a spacing therebetween, over its entire circumference. This permits an independent displacement of the independent mass member 132 relative to the circumferential wall portion of the accommodation space 130, i.e., the housing portion.

Figure 8:
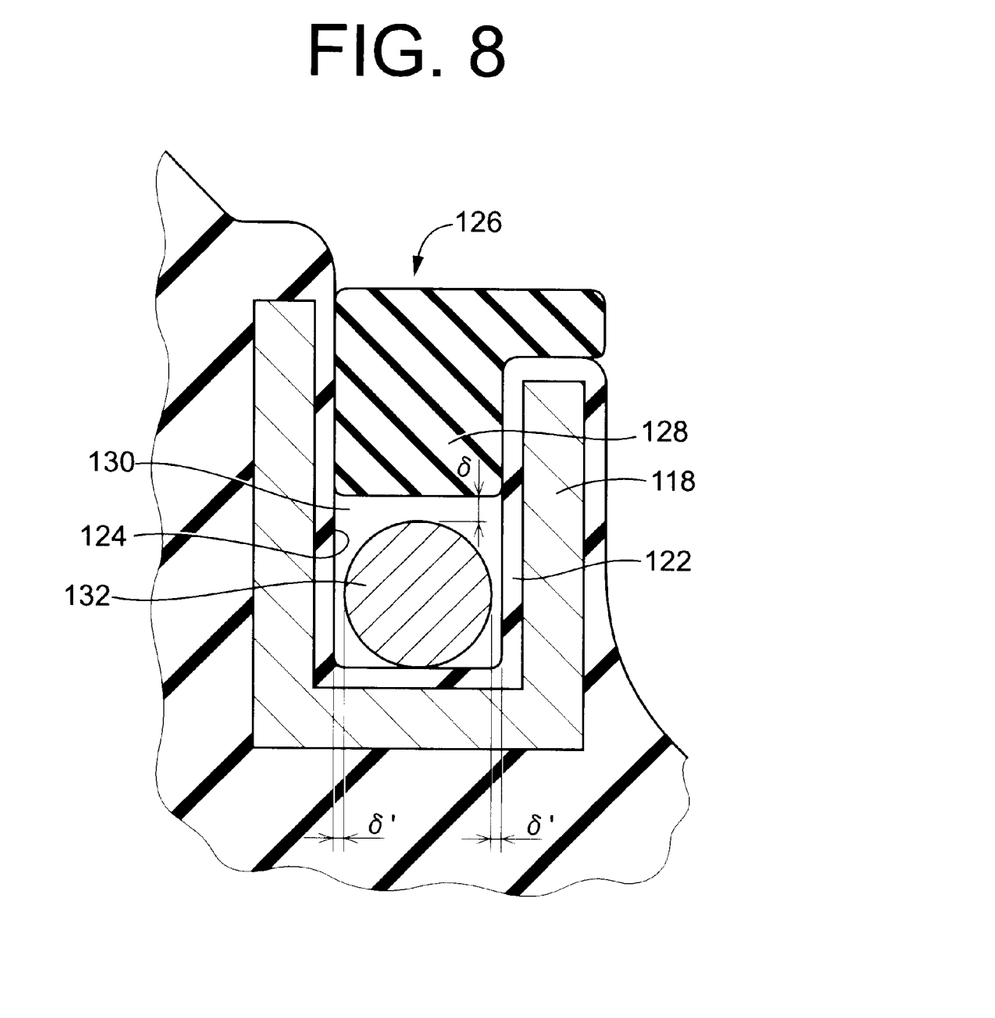
FIG. 8 is a fragmentally enlarged view of a primary part of the engine mount of FIG. 7.

In the static state of the engine mount 70, where no vibrational load is applied to the engine mount 70, the independent mass member 132 is held in contact with the lower surface of the accommodation space 130, i.e., the bottom surface of the accommodation groove 124 due to gravity acted thereto, and are spaced apart from the upper surface of the accommodation space 130, i.e., the protruding end face of the annular protrusion 128 with a predetermined axial spacing "$\delta$" therebetween, as shown in FIG. 8. The dimension of the radial spacing "$\delta$" is held within a range of 0.2–1.6 mm, more preferably within a range of 0.2–1.0 mm. Further, the distance: $\delta'$ between radially inner and outer surfaces of the accommodation space 130 and respective portions of the outer circumferential surface of the independent mass member 132, which portions are brought into abutting contact with the radially inner and outer surfaces of the accommodation space 130, is held within a range of 0.1–0.8 mm, more preferably, within a range of 0.1–0.5 mm. This arrangement permits a reciprocating motion of the independent mass member 132 by a distance within a range of 0.2–1.6 mm, more preferably within a range of 0.2–1.0 mm, between the axially or radially opposed inner surfaces of the circumferential wall portion of the accommodation space 130, i.e., in the axial and radial direction of the housing case 118.

In the engine mount 70 constructed according to the present embodiment, the pressure of the fluid within the pressure receiving chamber 106 is changed upon application of the vibrational load between the first and second mounting members 72, 74 in the axial direction, i.e., in the primary load receiving direction. The pressure change of the pressure receiving chamber 106 causes flows of the fluid through the orifice passage 110 and elastic deformation of the movable rubber plate 114 and a resultant flows of the fluid through the through holes 116. Thus, the present engine mount 70 exhibits the desired vibration damping effect on the basis of the resonance or flows of the fluid through the orifice passage 110 and the through holes 116.

When the engine mount 70 is subjected to the above-indicated vibrational load, the elastic body 76 repeatedly undergoes shear deformation in the opposite directions in which the elastic body 76 is moved toward and away from the pressure receiving chamber 106. This may possibly causes the surging of the elastic body 76 upon application of vibrations over a specific frequency band. Like the engine mount 10 of the first embodiment, the surging of the elastic body 76, which is accompanied with the elastic displacement or oscillation of the elastic body 76 in a direction in which the elastic body 76 undergoes shear deformation, effectively excites the bouncing displacement of the independent mass member 132 in the accommodation space 130, resulting in repeated impact of the independent mass member 132 against the inner circumferential surface of the housing consisting of the accommodation groove 124 and the closure plate 126. This repeated impacts of the independent mass member 132 against the inner circumferential surface of the housing is effective to restrict or limit the surging of the elastic body 76. Thus, the engine mount 70 of the present embodiment is capable of reducing or minimizing deterioration of the vibration damping capability thereof upon application of a vibrational load within a surging frequency of the elastic body 76, while assuring desired vibration damping characteristics thereof with respect to input vibrations over a wide frequency range with high stability.

In particular, the rigid housing case 118 is fixedly disposed in the elastic body 76. This housing case 118 is effective to prevent an undesirable deformation of the accommodation space 130 upon application of the vibrational load, thus ensuring a desired impact of the independent mass member 132 against the housing consisting of the accommodation groove 124 and the cover 126. The presence of the rigid housing case 118 is also effective to restrict or limit irregular deformation of the elastic body 76, thus further stabilizing vibration damping characteristics of the engine mount 70.

While the present invention has been described in detail with its presently preferred embodiments for the illustrative purpose only, it is to be understood that the invention is not limited to the details of the illustrated embodiments, but may be otherwise embodied.

For instance, while the present invention is applied to a solid-type or non-fluid filled type cylindrical elastic engine mount 10 in the first embodiment, the present invention is applicable to a fluid-filled cylindrical elastic mount as disclosed in JP-A-1-153830, likewise.

The number of the independent mass member to be accommodated in one accommodation space is not particularly limited to the illustrated embodiment. It is possible to accommodate a plurality of independent mass members in one accommodation space, for example. In this case, the plurality of independent mass members may have the uniform configuration, or alternatively may have different configurations. The plurality of independent mass members may be aligned with each other in series, or in parallel in a direction in which a vibrational load is applied.

The profile of the inner surface of the housing portion and the profile of the outer surface of the independent mass member are not particularly limited to the illustrated embodiment but may be desirably determined taking into account a configuration or size of an area in which the housing portion is formed. For instance, the inner surface of the housing member may have a polygonal or spherical profile. The outer surface of the independent mass member may have a plate-like or spherical profile. In particular, the independent mass member having the spherical profile is advantageous to deal with a plurality of vibrational loads that are applied to the independent mass member in different directions. The surface of the independent mass member may be covered by a thin-rubber layer, for thereby effectively eliminating a problem of impact noises generated upon impact of the independent mass member against the housing portion, even if the housing portion is made of a rigid material such as metal.

The distance of the reciprocating motion of the independent mass member relative to the housing portion in the load receiving direction is not particularly limited. In the engine mount 50 according to the second embodiment, for example, the axial spacing distance between the axially opposite end faces of the independent mass member 62 and the respective covering member 56, 56 may possibly be increased, provided the independent mass member 62 does not use for attenuating or limiting the surging of the elastic connecting members 30, 30 of the elastic body 16.

While the present invention is applied to the vibration damper for an automotive vehicle, in the illustrated embodiments, the present invention is suitably applicable to the other vibration dampers used for the vehicle, such as a body mount, a differential mount, and a suspension bushing, and used for various kinds of devices other than the vehicles.

It is also to be understood that the present invention may be embodied with various other changes, modifications and improvements, which may occur to those skilled in the art, without departing from the spirit and scope of the invention defined in the following claims.

What is claimed is:

1. A vibration-damping device for elastically connecting two members of a vibration system in a vibration damping fashion, said vibration-damping device comprising:

a first mounting member attachable to one of the two members of the vibration system;

a second mounting member disposed away from said first mounting member and attachable to an other one of the two members of the vibration system;

an elastic body disposed between and elastically connecting said first and second mounting members, said elastic body including a connecting portion that extends between said first and second mounting members and has a hollow housing portion formed therein such that said housing portion is spaced apart from said first and said second mounting members so as to be displaceable in an entirety thereof relative to said first and second mounting members; and an independent mass member accommodated in said housing portion with a spacing therebetween such that said independent mass member is independently displaceable relative to said housing portion without being bonded to said housing portion, and is brought into direct and elastic impact against said housing portion.

2. A vibration-damping device according to claim 1, wherein said housing portion formed in said connecting portion of said elastic body is located at a substantially central portion between the first mounting member and said second mounting member in a direction in which said first and second mounting member are connected to each other via said connecting portion.

3. A vibration-damping device according to claim 1, wherein said housing portion includes a rigid case member bonded by vulcanization to said elastic body.

4. A vibration-damping device according to claim 3, wherein said case member includes an abutting surface adapted to impact against said independent mass member, said abutting surface of said case member being covered by an abutting rubber layer integrally formed with said elastic body.

5. A vibration-damping device according to claim 1, wherein said connecting portion of said elastic body undergoes shear deformation thereof upon application of a vibrational load between said first and second mounting members, and said independent mass member is independently displaceable relative to and is brought into direct and elastic impact against said housing portion in a direction in which said connecting portion of said elastic body undergoes shear deformation.

6. A vibration-damping device according to claim 5, wherein said housing portion formed in said connecting portion of said elastic body is located at an intermediate portion between said first and second mounting members, and extends in a direction perpendicular to said direction in which said connecting portion of said elastic body undergoes shear deformation.

7. A vibration-damping device according to claim 6, wherein said independent mass member has an elongated shape and extends continuously in a longitudinal direction of said housing portion.

8. A vibration-damping device according to claim 1, wherein said first mounting member comprises an inner shaft member and said second mounting member comprises an outer sleeve member disposed radially outward of said inner shaft member with a radial spacing therebetween, while the elastic body is interposed between said inner shaft member and said outer sleeve member, said elastic body having a pair of voids formed therethrough over an entire axial length thereof at respective portions opposed to each other in a diametric direction perpendicular to an axis of said inner shaft member in which a vibrational load is applied between said inner shaft member and said outer sleeve member, to thereby provide a pair of elastic connecting portions of said elastic body, said pair of elastic connecting portions elastically connecting said inner shaft member and said outer sleeve member with each other in respective diametric directions perpendicular to said axis of said inner shaft member, and said housing portion being formed in each of said pair of said elastic connecting portions of said elastic body.

9. A vibration-damping device according to claim 8, wherein each of said pair of elastic connecting portions has a through hole axially extending therethrough to thereby constitute said housing portion, while said independent mass member has a rod shape and is disposed in said through hole such that said independent mass member extends through said through hole and is provided with a projection for preventing a disengagement thereof from said through hole.

10. A vibration-damping device according to claim 1, wherein said second mounting member has a cylindrical portion, and said first mounting member is substantially coaxially disposed on one of axially opposite sides of said cylindrical portion of said second mounting member with an axial spacing therebetween, while said elastic body has a substantially tapered cylindrical shape and extends radially outwardly from said first mounting member to an open end portion of said cylindrical portion of said second mounting member so as to elastically connect said first mounting member and said cylindrical portion of said second mounting member, said open end portion of said cylindrical portion of said second mounting member being fluid-tightly closed by said elastic body to thereby form within said cylindrical portion of said second mounting member a fluid chamber partially defined by said elastic body and filled with a non-compressible fluid, so that said vibration-damping device exhibit a vibration damping effect on the basis of flows of said non-compressible fluid, and said housing portion formed in said connecting portion of said elastic body being located at an intermediate portion between said first and second mounting members in a direction in which said first mounting member and said cylindrical portion of said second mounting member are connected to each other via said connecting portion, and extending in a circumferential direction of said elastic body.

11. A vibration-damping device according to claim 10, further comprising: a partition structure adapted to fluid-tightly divide said fluid chamber into a pressure receiving chamber partially defined by said elastic body whose pressure is variable due to an elastic deformation of said elastic body, and an equilibrium chamber partially defined by a flexible diaphragm whose volume is variable due to an elastic displacement of said flexible diaphragm; and an orifice passage for fluid communication between said pressure receiving chamber and said equilibrium chamber, said vibration damping device exhibiting a vibration damping effect on the basis of resonance of said fluid flowing through said orifice passage.

12. A vibration-damping device according to claim 1, wherein said housing portion includes a housing body member fixed to said elastic body and being open at an opening thereof in an surface of said elastic body, and a covering member adapted to cover said opening of said housing body member, said independent mass member being accommodated within said housing body member whose opening is closed by said covering member fixed to said opening of said housing body member.

13. A vibration-damping device according to claim 1, further comprising a fluid-chamber partially defined by said connecting portion of said elastic body and filled with a non-compressible fluid whose pressure varies upon application of a vibrational load between said first and second mounting members, said housing portion accommodating said independent mass member being formed in said connecting portion partially defining said fluid pressure chamber.

14. A vibration-damping device according to claim 1, wherein at least one of an abutting surface of said independent mass member and an abutting surface of said housing portion has a Shore D hardness of 80 or lower.

15. A vibration-damping device according to claim 1, wherein said independent mass member in a single form thereof has a mass within a range of 10–1000 g.

16. A vibration-damping device according to claim 1, wherein said independent mass member is reciprocatory movable relative to said housing member by a distance of 0.2–1.6 mm, in a direction in which a vibrational load is applied to said housing portion.

* * * * *